(12) United States Patent
Kondo et al.

(10) Patent No.: US 11,661,090 B2
(45) Date of Patent: May 30, 2023

(54) APPARATUS FOR AUTOMATED DRIVING WITH NOTIFICATION TIMING BASED ON DETECTED FEATURES

(71) Applicant: TOYOTA JIDOSHA KABUSHIKI KAISHA, Toyota (JP)

(72) Inventors: Suzuka Kondo, Nishitokyo (JP); Ryo Hashimoto, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 82 days.

(21) Appl. No.: 17/156,876

(22) Filed: Jan. 25, 2021

(65) Prior Publication Data
US 2021/0229708 A1 Jul. 29, 2021

(30) Foreign Application Priority Data
Jan. 27, 2020 (JP) .............. JP2020-011150

(51) Int. Cl.
*B60W 60/00* (2020.01)
*B60W 50/14* (2020.01)
*G06V 20/56* (2022.01)

(52) U.S. Cl.
CPC ........ *B60W 60/0059* (2020.02); *B60W 50/14* (2013.01); *B60W 60/001* (2020.02); *B60W 60/0051* (2020.02); *B60W 60/0053* (2020.02); *G06V 20/588* (2022.01); *B60W 2050/143* (2013.01); *B60W 2552/53* (2020.02)

(58) Field of Classification Search
CPC ............. B60W 60/0059; B60W 50/14; B60W 60/001; B60W 60/0051; B60W 60/0053; B60W 2050/143; B60W 2552/53; B60W 60/0057; G06V 20/588
See application file for complete search history.

(56) References Cited

U.S. PATENT DOCUMENTS

| | | | |
|---|---|---|---|
| 8,676,431 B1* | 3/2014 | Mariet | G08G 1/0962 701/28 |
| 2015/0094899 A1* | 4/2015 | Hackenberg | B60K 28/14 701/23 |
| 2018/0203455 A1 | 7/2018 | Cronin et al. | |

(Continued)

FOREIGN PATENT DOCUMENTS

| | | |
|---|---|---|
| JP | 2008290680 A | 12/2008 |
| JP | 2017102007 A | 6/2017 |

(Continued)

OTHER PUBLICATIONS

English translation and Augst (De 102017214686 A1) (Year: 2019).*

*Primary Examiner* — James J Lee
*Assistant Examiner* — Andrew Sang Kim
(74) *Attorney, Agent, or Firm* — Dickinson Wright, PLLC

(57) ABSTRACT

The apparatus for automated driving includes a processor configured to: determine whether a change of a travel condition or a controller of a vehicle that is being automatically driven is necessary; when the change is necessary, detect a predetermined feature that is visible to a driver, predetermined notification that is recognizable to the driver, or a predetermined situation around the vehicle; and when the feature, the notification or the situation is detected, control the vehicle so as to make the change, or notify the driver of the change with a notifying device.

6 Claims, 7 Drawing Sheets

(56) References Cited

U.S. PATENT DOCUMENTS

| | | | |
|---|---|---|---|
| 2018/0357496 A1 | 12/2018 | Chiba et al. | |
| 2019/0054928 A1* | 2/2019 | Hatano | B60W 30/18109 |
| 2019/0344801 A1* | 11/2019 | Ishii | B60W 50/08 |

FOREIGN PATENT DOCUMENTS

| | | |
|---|---|---|
| JP | 2018181269 A | 11/2018 |
| JP | 2019021216 A | 2/2019 |

* cited by examiner

APPARATUS FOR AUTOMATED DRIVING WITH NOTIFICATION TIMING BASED ON DETECTED FEATURES

FIELD

The present invention relates to an apparatus for automated driving control of a vehicle.

BACKGROUND

Techniques for automated driving control of a vehicle have been researched. However, even when a vehicle is under automated driving control, the driver may need to manually drive the vehicle, depending on situations around the vehicle, for example.

For this reason, a technique has been proposed to switch, under a predetermined condition, the mode of drive control of a vehicle from an automated driving mode, in which automated driving control is applied, to a manual driving mode, in which the driver manually drives the vehicle (e.g., see Japanese Unexamined Patent Publication No. 2008-290680). In an automated driving section where a target vehicle automatically travels, this technique sets a handover location to start handover from automated driving to manual driving and a halt region to which the automatically traveling vehicle evacuates such that the handover location is closer to the vehicle than the halt region, allowing for smooth switching from automated driving to manual driving.

SUMMARY

However, the above described technique does not allow the driver to grasp the timing to change the travel condition of the vehicle that is under automated driving control or the timing of notification of a switch from the automated driving mode to the manual driving mode. For this reason, the driver may feel anxious or fail to appropriately drive the vehicle immediately after the switch.

It is an object of the present invention to provide an apparatus for automated driving that can reduce driver's anxiety.

According to an embodiment, an apparatus for automated driving is provided. The apparatus includes a processor configured to: determine whether a change of a travel condition or a controller of a vehicle that is being automatically driven is necessary; when the change is necessary, detect a predetermined feature that is visible to a driver, predetermined notification that is recognizable to the driver, or a predetermined situation around the vehicle; and when the feature, the notification or the situation is detected, control the vehicle so as to make the change, or notify the driver of the change with a notifying device.

Preferably, the processor of the apparatus determines a maximum delaying quantity indicating a location furthest from the vehicle or latest timing to start the change determined to be necessary, the maximum delaying quantity being determined so that the change is to be finished in time, and when a period corresponding to the maximum delaying quantity has elapsed since determining that the change is necessary, the processor controls the vehicle so as to make the change or notifies the driver of the change with the notifying device even though neither the feature, the notification nor the situation is detected.

When a predetermined delay time has elapsed since detection of the feature, the notification or the situation, the processor of the apparatus preferably controls the vehicle so as to make the change or notifies the driver of the change with the notifying device.

In this case, the processor preferably adjusts the predetermined delay time as a function of a speed of the vehicle at the time of detection of the feature, the notification or the situation, a height of the detected feature measured from a road surface, or an interval between the vehicle and another vehicle traveling ahead of the vehicle.

In the apparatus, the predetermined feature is preferably a signpost or road marking related to the change, or a feature having a predetermined positional relationship with a location where the change is made.

In the apparatus, the predetermined notification is preferably traffic information on a traffic situation that causes the change, the traffic information being received with a wireless communication device mounted on the vehicle.

Preferably, the change determined to be necessary is a change of lanes on which the vehicle travels, and as the predetermined situation, the processor of the apparatus detects a safe situation around the vehicle in which the driver recognizes that the change of lanes is to be made safely.

The apparatus according to the present invention has an advantageous effect of being capable of reducing driver's anxiety.

DESCRIPTION OF EMBODIMENTS

Hereinafter, an apparatus for automated driving will be described with reference to the accompanying drawings. The apparatus determines whether a change of a travel condition or a controller of a vehicle that is being automatically driven is necessary, and, when this change is necessary, detects a predetermined feature that is visible to a driver, predetermined notification that is recognizable to the driver, or a predetermined situation around the vehicle. When such a feature, notification or situation is detected, the apparatus controls the vehicle so as to change the travel condition or the controller, or notifies the driver of this change with a notifying device. The apparatus thus enables the driver to grasp the timing to change the travel condition or the controller of the vehicle. As a result, the apparatus can reduce driver's anxiety and thus enable the driver to appropriately drive the vehicle immediately after a switch from an automated driving mode to a manual driving mode.

Figure 1:
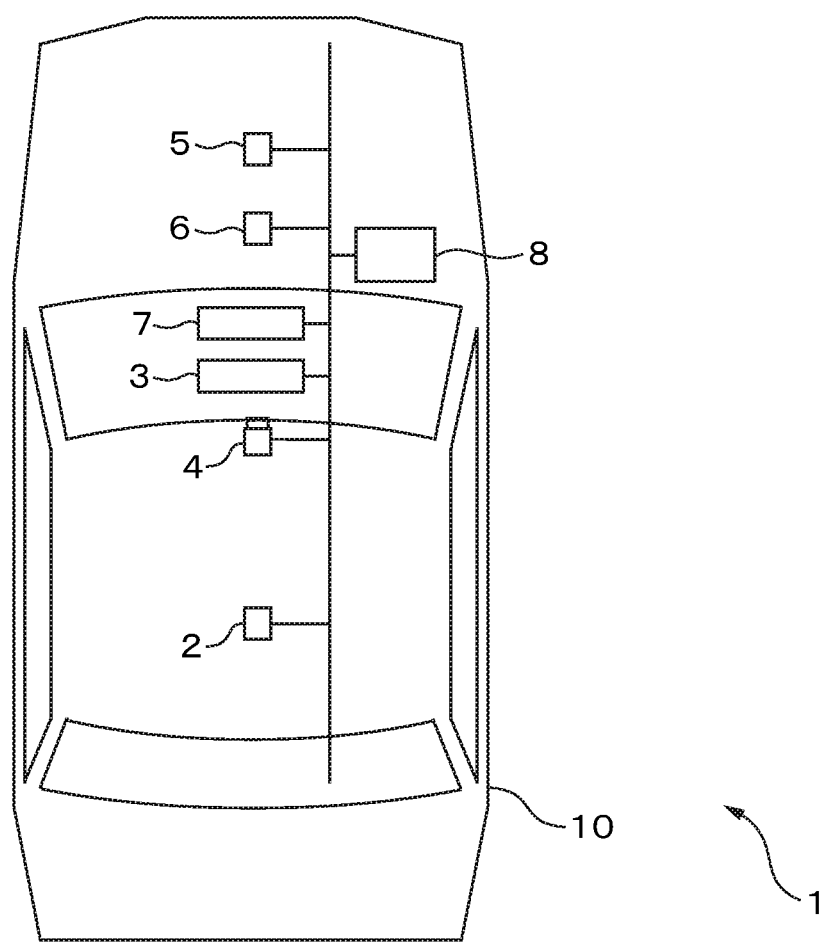
FIG. 1 schematically illustrates the configuration of a vehicle control system having an apparatus for automated driving mounted thereon.
Figure 2:
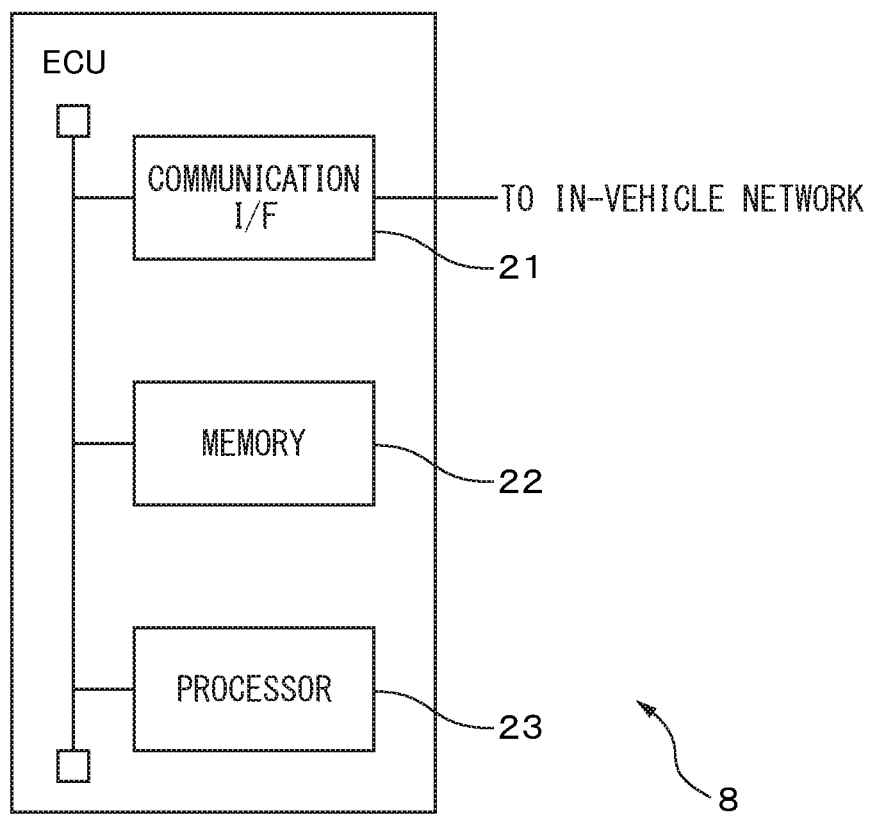
FIG. 2 illustrates the hardware configuration of an electronic control unit, which is an embodiment of the apparatus for automated driving.

FIG. 1 schematically illustrates the configuration of a vehicle control system having an apparatus for automated driving mounted thereon. FIG. 2 illustrates the hardware configuration of an electronic control unit, which is an embodiment of the apparatus for automated driving. In the present embodiment, the vehicle control system 1, which is mounted on a vehicle 10 and controls the vehicle 10, includes a GPS receiver 2, a navigation device 3, a camera 4, a wireless communication device 5, a storage device 6, a user interface 7, and an electronic control unit (ECU) 8, which is an example of the apparatus for automated driving. The GPS receiver 2, the navigation device 3, the camera 4, the wireless communication device 5, the storage device 6, and the user interface 7 are connected to the ECU 8 so that they can communicate via an in-vehicle network conforming to a standard, such as a controller area network. The vehicle control system 1 may further include a distance sensor (not illustrated), such as LiDAR or radar, which measures the distance from the vehicle 10 to an object around the vehicle 10. The vehicle control system 1 may include a receiver conforming to another satellite positioning system, instead of the GPS receiver 2.

The GPS receiver 2 receives a GPS signal from a GPS satellite every predetermined period, and determines the location of the vehicle 10 on the basis of the received GPS signal. The GPS receiver 2 then outputs the determination result of the location of the vehicle 10 obtained from the GPS signal to the navigation device 3 and the ECU 8 via the in-vehicle network every predetermined period.

The navigation device 3 executes a navigation program thereon to perform a navigation process on the vehicle 10. For example, when the driver starts the navigation program and inputs a destination of the vehicle 10, the navigation device 3 refers to a map for navigation stored therein to determine a travel route of the vehicle 10 from the current location of the vehicle 10 to the destination in accordance with a predetermined route searching technique, such as Dijkstra's algorithm. The travel route includes information indicating the roads through which the vehicle travels to the destination and the locations of intersections at which the vehicle turns right or left, for example. The navigation device 3 can use, for example, the location of the vehicle 10 obtained from the latest determination result received from the GPS receiver 2 as the current location of the vehicle 10.

When determining a travel route of the vehicle 10, the navigation device 3 outputs information indicating the travel route to the ECU 8 via the in-vehicle network.

The camera 4 is an example of an image capturing unit, and includes a two-dimensional detector constructed from an array of optoelectronic transducers, such as CCD or C-MOS, having sensitivity to visible light and a focusing optical system focusing an image of a target region on the two-dimensional detector. The camera 4 is attached in such way that it is oriented in the front direction of the vehicle 10, for example, inside a vehicle interior of the vehicle 10. The camera 4 takes a picture of a region in front of the vehicle 10 every predetermined capturing period (e.g., 1/30 to 1/10 seconds), and generates images in which this region is captured. The images captured by the camera 4 may be color or gray images. The vehicle 10 may include multiple cameras taking pictures in different orientations or having different focal lengths.

Every time generating an image, the camera 4 outputs the generated image to the ECU 8 via the in-vehicle network.

The wireless communication device 5 communicates with a wireless base station by wireless in conformity with a predetermined standard of mobile communications. The wireless communication device 5 receives, from another device via the wireless base station, traffic information indicating a traffic situation of the road on which the vehicle 10 is traveling or of the neighborhood thereof, e.g., information provided by the Vehicle Information and Communication System (VICS [registered trademark]), and outputs the traffic information to the ECU 8 via the in-vehicle network. The traffic information includes, for example, information on the presence or absence of road construction, an accident or traffic restrictions, and the locations and times of day at which the road construction is carried out, the accident occurred or the traffic restrictions are imposed. The wireless communication device 5 may receive a high-precision map of a predetermined region around the current location of the vehicle 10 from a map server via the wireless base station, and output the received map to the storage device 6; the high-precision map is used for automated driving control.

The storage device 6 includes, for example, a hard disk drive, a nonvolatile semiconductor memory, or an optical recording medium and an access device therefor, and stores the high-precision map. The high-precision map includes, for example, information indicating signposts and road markings, such as lane division lines or stop lines, on the roads included in a predetermined region represented on this map.

The storage device 6 may further include a processor for performing a process to update the high-precision map, a process related to a request from the ECU 8 to read out the high-precision map, and other processes. For example, every time the vehicle 10 moves a predetermined distance, the storage device 6 may transmit a request to acquire a high-precision map together with the current location of the vehicle 10 to the map server with the wireless communication device 5, and receive the high-precision map of a predetermined region around the current location of the vehicle 10 from the map server with the wireless communication device 5. When receiving a request from the ECU 8 to read out the high-precision map, the storage device 6 cuts out that portion of the high-precision map stored therein which includes the current location of the vehicle 10 and shows a region narrower than the predetermined region, and outputs the cut portion to the ECU 8 via the in-vehicle network.

The user interface 7 is an example of the notifying device, and includes, for example, a display device, such as a liquid crystal display, or a touch panel display. The user interface 7 is placed inside the vehicle 10, e.g., near the instrument panel, so as to face the driver. The user interface 7 displays various types of information received from the ECU 8 via the in-vehicle network to notify the driver of the information. The user interface 7 may further include a speaker placed inside the vehicle. In this case, the user interface 7 outputs, in the form of a voice signal, various types of information received from the ECU 8 via the in-vehicle network to notify the driver of the information.

The information notified by the user interface 7 to the driver includes, for example, information that the driving mode applied to the vehicle 10 will switch from the automated driving mode to the manual driving mode, or information that the travel condition of the vehicle 10 will change.

The ECU 8 determines whether to switch the driving mode applied to the vehicle 10 between the automated driving mode and the manual driving mode. For example, when receiving an operation signal indicating setting to the automated driving mode from a selector switch (not illustrated) of the driving mode provided on the steering wheel, the ECU 8 determines whether to apply the automated driving mode on the basis of the current location of the vehicle 10. For example, when the current location of the vehicle 10 is included in the region represented on the high-precision map, the ECU 8 determines to apply the automated driving mode. In applying the automated driving mode, the ECU 8 performs automated driving control of the vehicle 10 in accordance with the current location of the vehicle 10, images of the surroundings of the vehicle 10, the high-precision map, and the determined travel route. When the vehicle 10 is in the automated driving mode, the ECU 8 determines whether a change of the travel condition of the vehicle 10 or a change of the driving mode applied to the vehicle 10 from the automated driving mode to the manual driving mode is necessary. When such a change is necessary, the ECU 8 detects a predetermined feature that is visible to a driver, predetermined notification that is recognizable to the driver, or a predetermined situation around the vehicle 10. When such a feature, notification or situation is detected, the ECU 8 controls the vehicle 10 so as to change the travel condition or to switch from the automated driving mode to the manual driving mode, or notifies the driver of this change with the user interface 7.

As illustrated in FIG. 2, the ECU 8 includes a communication interface 21, a memory 22, and a processor 23. The communication interface 21, the memory 22 and the processor 23 may be separate circuits or a single integrated circuit.

The communication interface 21 includes an interface circuit for connecting the ECU 8 to the in-vehicle network. Every time receiving the determination result of the location of the vehicle from the GPS receiver 2, the communication interface 21 passes the determination result to the processor 23. Every time receiving an image from the camera 4, the communication interface 21 passes the received image to the processor 23. When receiving a travel route from the navigation device 3, the communication interface 21 passes it to the processor 23. The communication interface 21 also passes the high-precision map loaded from the storage device 6 to the processor 23. When receiving notification information from the processor 23, the communication interface 21 outputs it to the user interface 7.

The memory 22 includes, for example, volatile and non-volatile semiconductor memories, and stores various types of data used in a vehicle control process performed by the processor 23 of the ECU 8. For example, the memory 22 stores images of the surroundings of the vehicle 10, the determination result of the location of the vehicle, the high-precision map, internal parameters of the camera 4, and various parameters for specifying an object-detecting classifier used for detection of a feature that is a trigger for notification, for example. The memory 22 also temporarily stores various types of data generated during the vehicle control process.

The processor 23 includes one or more central processing units (CPUs) and a peripheral circuit thereof. The processor 23 may further include another arithmetic circuit, such as an arithmetic logic unit, a numeric data processing unit or a graphics processing unit. The processor 23 performs the vehicle control process for the vehicle 10.

Figure 3:
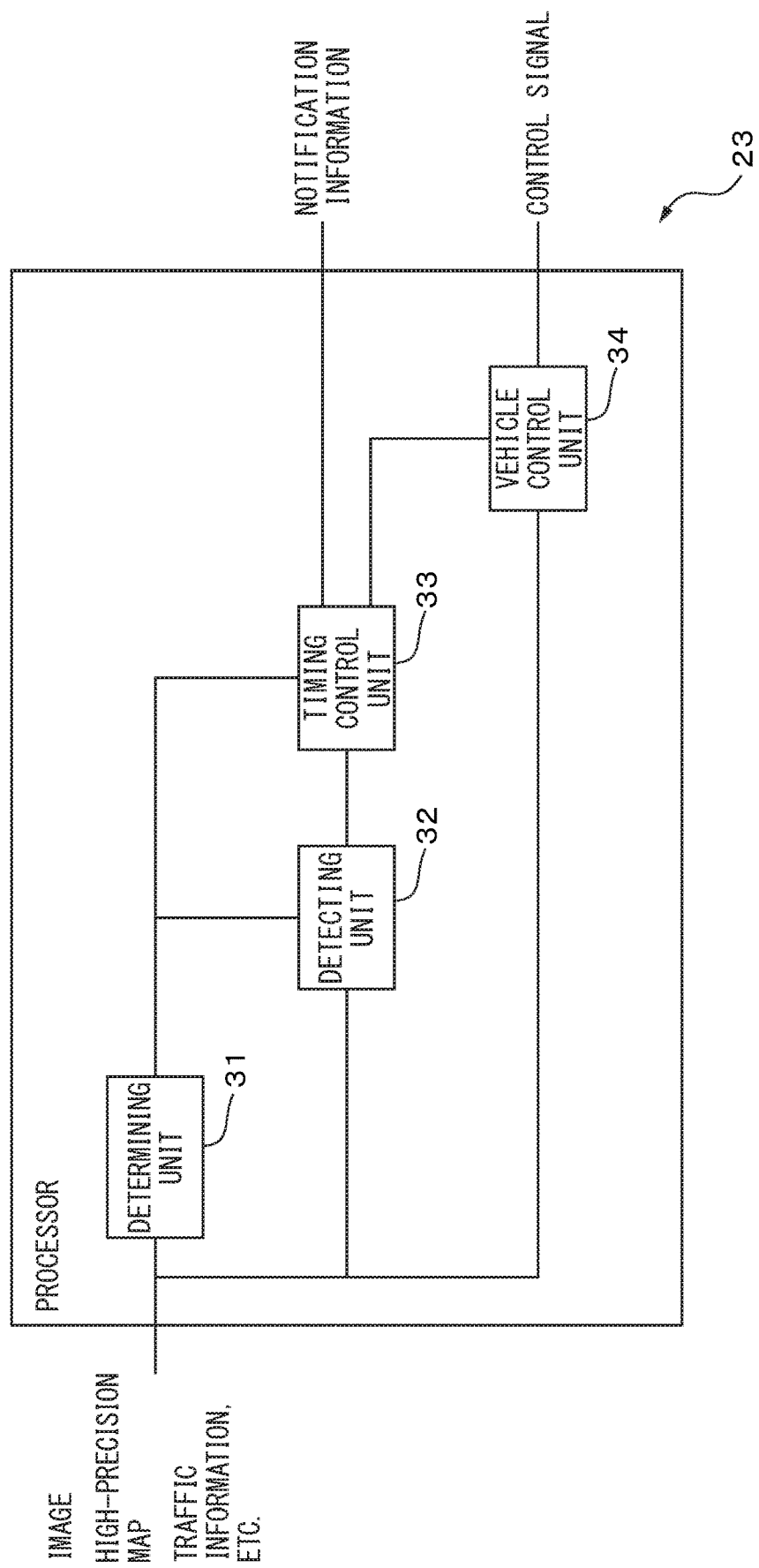
FIG. 3 is a functional block diagram of a processor of the electronic control unit, related to an automated driving control process.

FIG. 3 is a functional block diagram of the processor 23, related to the vehicle control process. The processor 23 includes a determining unit 31, a detecting unit 32, a timing control unit 33, and a vehicle control unit 34. These units included in the processor 23 are, for example, functional modules implemented by a computer program executed on the processor 23, or may be dedicated arithmetic circuits provided in the processor 23.

When the vehicle 10 is in the automated driving mode, the determining unit 31 determines, every predetermined period, whether a change of the travel condition or the controller of the vehicle 10 is necessary while the vehicle 10 travels a predetermined distance from the current location. In the present embodiment, examples of the change of the travel condition of the vehicle 10 include a change of lanes on which the vehicle travels. Examples of the change of lanes include not only a lane change that is required because a lane on a travel route toward a destination branches or merges with another lane, and a lane change to a lane for going in a particular direction (e.g., a lane for a right or left turn), but also a lane change for passing a preceding vehicle. Examples of the change of the travel condition may also include other changes in state related to travel of the vehicle 10, such as a change of the speed of the vehicle 10, a right turn, a left turn, and a stop. The change of the controller includes, for example, a switch from the automated driving mode to the manual driving mode, and a request to hold the steering wheel ("Hands-On request").

For example, the determining unit 31 determines that a lane change is necessary as a change of the travel condition in the case that the vehicle 10 needs to turn right or left at an intersection while traveling through a predetermined length of section (e.g., 1 km to 5 km) from the current location along the travel route toward a destination and that the lane on which the vehicle 10 is currently traveling differs from the lane for the right or left turn.

More specifically, the determining unit 31 refers to the high-precision map and the travel route to determine whether the predetermined length of section from the current location of the vehicle 10 along the travel route includes an intersection at which the vehicle 10 will turn right or left. When such an intersection is included, the determining unit 31 identifies the lane on which the vehicle 10 is currently traveling. For example, the determining unit 31 estimates the location and orientation of the vehicle 10, and projects an object on the road surface (e.g., a road marking, such as a lane division line or a stop line) detected from an image captured by the camera 4 onto the high-precision map, or projects an object on the road surface around the vehicle 10 in the high-precision map onto the image. The determining unit 31 then assumes the location and orientation of the vehicle 10 for the case that the object on the road surface detected from the image best agrees with that represented on the high-precision map to be the real location of the vehicle 10. The determining unit 31 may then refers to the high-precision map to identify the lane including the location of the vehicle 10 as the lane on which the vehicle 10 is traveling.

For example, in order to detect an object on a road surface from an image, the determining unit 31 inputs the image to a classifier that has been trained to do so. In this case, as the classifier for detecting an object on a road surface, the determining unit 31 may use, for example, a deep neural network (DNN) having a convolutional neural network (CNN) architecture, such as a Single Shot MultiBox Detector (SSD) or a Faster R-CNN.

The determining unit 31 uses initial values of the estimated location and orientation of the vehicle 10, and internal parameters of the camera 4, such as its focal length, its height from the road surface, and its orientation, to project an object on the road surface detected from an image onto the high-precision map or to project an object on the road surface around the vehicle 10 in the high-precision map onto the image. The determining unit 31 then calculates the degree of agreement (e.g., a normalized cross-correlation value) between the object on the road surface detected from the image and that represented on the high-precision map.

The determining unit 31 repeats the above described process while varying the estimated location and orientation of the vehicle 10. The determining unit 31 may assume the location and orientation for the case that the degree of agreement is its maximum to be the real location of the vehicle 10.

In the case that a localizing unit (not illustrated) is provided apart from the ECU 8 to perform a localizing process for estimating the location of the vehicle 10 every predetermined period, the determining unit 31 may acquire, from the localizing unit, information indicating the location of the vehicle 10 and the lane on which the vehicle is traveling.

Similarly, the determining unit 31 may refer to the travel route to determine that a lane change is necessary as a change of the travel condition in the case that a predetermined length of section from the current location of the vehicle 10 along the travel route includes a location where the travel route extends to a route branching from a certain lane and that the lane on which the vehicle 10 is currently traveling differs from the branching lane. The determining unit 31 may also determine that a lane change is necessary as a change of the travel condition in the case that traffic information received with the wireless communication device 5 indicates that the vehicle 10 will not be able to travel on the current lane in a predetermined length of section.

The determining unit 31 may also determine that a lane change is necessary as a change of the travel condition in the case that the speed of a vehicle traveling ahead of the vehicle 10 on the lane of the vehicle 10 (hereinafter, referred to as a preceding vehicle) is slower by a predetermined amount than a target speed of the vehicle 10 for a predetermined period. In this case, the determining unit 31 can estimate the speed of the preceding vehicle, for example, on the basis of the amount of change of the distance to the preceding vehicle in a predetermined period obtained by a distance sensor mounted on the vehicle 10, and the speed of the vehicle 10 and the amount of change thereof in the predetermined period. Alternatively, the determining unit 31 may estimate the speed of the preceding vehicle on the basis of the time-varying changes of the size of the region where the preceding vehicle is represented in a series of images captured by the camera 4 in a predetermined period, and the speed of the vehicle 10 and the amount of change thereof in the predetermined period.

The determining unit 31 may also determine that a right or left turn is necessary as a change of the travel condition in the case that a predetermined length of section through which the vehicle 10 travels from the current location along the travel route toward a destination includes a location where a right or left turn is required.

The determining unit 31 may also determine that a change of the vehicle speed is necessary as a change of the travel condition in the case that a predetermined length of section through which the vehicle 10 travels from the current location along the travel route toward a destination includes a location where the legally permitted speed changes. The determining unit 31 may also determine that a stop of the vehicle 10 is necessary as a change of the travel condition in the case that a predetermined length of section through which the vehicle 10 travels from the current location along the travel route toward a destination includes the destination or a location where a stop is required.

The determining unit 31 may also determine that a change of the controller of the vehicle 10 is necessary in the case that the vehicle 10 will not be able to continue automated driving while traveling through a predetermined length of section from the current location along the travel route. For example, the vehicle 10 will not be able to continue automated driving in the case that the vehicle 10 goes outside the region represented on the high-precision map before traveling through a predetermined length of section from the current location along the travel route. The determining unit 31 then determines that a change of the controller of the vehicle 10 is necessary. For example, assume that the high-precision map shows information on freeways but does not show information on ordinary roads. In this case, for example, an interchange of a freeway is a location where the vehicle goes outside the high-precision map.

The determining unit 31 may also determine whether the vehicle 10 can continue automated driving on the basis of the situation around the vehicle 10. When determining that the vehicle 10 cannot continue automated driving or that the driver should be notified of a Hands-On request via the user interface 7, the determining unit 31 may determine that a change of the controller of the vehicle 10 is necessary. For example, when traffic information received with the wireless communication device 5 indicates the presence of road construction, traffic restrictions, or a traffic jam at a certain location in a predetermined length of section from the current location of the vehicle 10 along the travel route, the determining unit 31 may determine that a change of the controller of the vehicle 10 is necessary.

According to a modified example, the determining unit 31 may determine a maximum delaying quantity. This quantity indicates a distance (hereinafter, referred to as a critical distance) from the current location of the vehicle 10 to a furthest location such that the change determined to be necessary can be delayed until the vehicle travels this distance. Alternatively, the maximum delaying quantity indicates the latest timing by which this change can be delayed. Such a maximum delaying quantity may be preset, for example, in accordance with the type of the change determined to be necessary. For example, when the necessary change is a lane change for the vehicle 10 to go to a destination, the critical distance, i.e., the maximum delaying quantity is set to the distance corresponding to the difference between the current location of the vehicle 10 and the location a length required for the vehicle 10 to change lanes before the location where travel of the vehicle 10 toward the destination (e.g., a right or left turn, or an entry into a branch route) is controlled. Alternatively, the maximum delaying quantity may be set to a critical time obtained by dividing the critical distance by the current speed of the vehicle 10. The length required for a lane change may be prestored, for example, in the memory 22. For example, when the necessary change is a switch from the automated driving mode to the manual driving mode, the critical distance, i.e., the maximum delaying quantity is set to the distance corresponding to the difference between the current location of the vehicle 10 and the location a length obtained by multiplying the minimum period required for notification of the switch by the current speed of the vehicle 10 before the furthest location where the switch can be finished in time.

When determining that a change of the travel condition or the controller of the vehicle 10 is necessary, the determining unit 31 notifies the detecting unit 32 and the timing control unit 33 of the determination result and the type of the change. When setting the maximum delaying quantity, the determining unit 31 also notifies the detecting unit 32 and the timing control unit 33 of the maximum delaying quantity.

When being notified of the determination result that a change of the travel condition or the controller of the vehicle 10 is necessary, the detecting unit 32 detects a predetermined feature that is visible to a driver, predetermined notification information that is recognizable to the driver, or a predetermined situation around the vehicle 10, which is a trigger to notify the driver of the change or to perform vehicle control for the change.

When detection of a predetermined feature that is visible to a driver is a trigger to notify the driver of a change of the travel condition or the controller of the vehicle 10 or to perform vehicle control for the change, examples of the predetermined feature include an object around the road, such as a signboard; a signpost; and a particular road marking. For example, the predetermined feature may be a signboard or signpost from the current location of the vehicle 10 to the location where the travel condition of the vehicle 10 or the controller of the vehicle 10 will change (e.g., a location where the vehicle goes outside the region represented on the high-precision map, such as an interchange of a freeway, as described above). The predetermined feature preferably has a predetermined relationship with the notified change. For example, the predetermined feature is preferably a signpost or road marking related to the notified change, or a signpost or signboard having a predetermined positional relationship with the location where the notified change will be made. For example, when the notified change is a right or left turn, or a lane change for this turn, the predetermined feature may be a signpost showing the intersection at which the right or left turn will be made. When the notified change is a change of the vehicle speed, the predetermined feature may be a signpost showing the legally permitted speed, which corresponds to the vehicle speed after the change. When the notified change is a stop of the vehicle 10, the predetermined feature may be a signpost or signboard (e.g., a signpost showing an intersection, or a signboard showing a shop name) showing the location where the vehicle will stop. When the notified change is a switch from the automated driving mode to the manual driving mode that follows exiting from a freeway, the predetermined feature may be the signpost or signboard nearest to the location where application of the automated driving mode will be finished in the section from the vehicle 10 to this location.

For example, the detecting unit 32 refers to the high-precision map to determine whether the predetermined feature is represented in a predetermined section (e.g., 100 m to 1 km) from the current location of the vehicle 10 along the travel route; the predetermined section is, for example, equal to or shorter than the interval in which the necessity to change the travel condition or the controller is determined. When the predetermined feature is represented in this section of the high-precision map, the detecting unit 32 determines that the predetermined feature is detected. When multiple target features are included in this section, the detecting unit 32 may detect one of the features that is furthest from the current location of the vehicle 10. When the critical distance corresponding to the maximum delaying quantity is set, the detecting unit 32 may set the predetermined section to a length equal to or shorter than the critical distance. The predetermined section may be set to a length such that the predetermined feature is visible to the driver from the current location of the vehicle 10.

Alternatively, the detecting unit 32 may detect the predetermined feature from an image captured by the camera 4. In this case, the detecting unit 32 inputs the image to a classifier that has been trained to detect the predetermined feature from an image, as in the detection of an object on a road surface from an image. When it is determined by the classifier that the predetermined feature is represented in some region on the image, the detecting unit 32 determines that the predetermined feature is detected. When the vehicle 10 includes a distance sensor, such as a LiDAR sensor or radar, in addition to the camera 4, the detecting unit 32 may detect the predetermined feature on the basis of a sensor signal obtained by the distance sensor. The detecting unit 32 may detect the distance to the predetermined feature on the basis of an image captured by the camera 4 and a sensor signal obtained by the distance sensor. For example, when a signpost is detected from an image inputted to the classifier as described above, the detecting unit 32 may regard the distance to the object indicated by the sensor signal of the distance sensor in the bearing of the region of the signpost on the image as the distance from the vehicle 10 to the detected signpost.

When detection of predetermined notification that is recognizable to the driver is a trigger to notify the driver of a change of the travel condition or the controller of the vehicle 10 or to perform vehicle control for the change as described above, the predetermined notification may be, for example, traffic information on a traffic situation that causes this change. When receiving the traffic information with the wireless communication device 5, the detecting unit 32 may determine that the predetermined notification that is recognizable to the driver is detected.

When detection of a predetermined situation is a trigger to notify the driver of a change of the travel condition or the controller of the vehicle 10 or to perform vehicle control for the change as described above, the detecting unit 32 may input, for example, an image captured by the camera 4 to a classifier to detect an object indicating the predetermined situation (e.g., a signboard showing traffic restrictions), thereby detecting the predetermined situation.

When the change of the travel condition of the vehicle 10 is a lane change, the predetermined situation around the vehicle 10 may be a safe situation in which the driver recognizes that the lane change will be made safely. The safe situation may be, for example, a situation in which no vehicle is traveling on the target lane, or a situation in which the vehicle 10 and another vehicle traveling on the target lane have a positional relationship such that the lane change of the vehicle 10 is supposed not to cause a collision with the other vehicle, e.g., a situation immediately after the other vehicle has passed the vehicle 10. In this case, the detecting unit 32 performs, for example, a predetermined tracking process on a vehicle detected from time-series images captured by the camera 4 or another camera being oriented in the rear direction or side direction of the vehicle 10, thereby tracking the former vehicle. The detecting unit 32 can detect a vehicle from the images by a process similar to that to detect a predetermined feature from an image. The bearing of another vehicle with respect to the vehicle 10 can be determined on the basis of the region showing the former vehicle on an image and the orientation of the camera having captured this image; when the target lane exists in the bearing of another vehicle, the detecting unit 32 can determine that this vehicle is traveling on the target lane. Thus, the detecting unit 32 may determine that the tracked vehicle has just passed the vehicle 10 in the case that the former vehicle has moved from the rear to the front of the vehicle 10. When no vehicle is detected in the region corresponding to the target lane in the images captured by the camera 4 or the camera being oriented in the rear direction or side direction of the vehicle 10, the detecting unit 32 may determine that no vehicle is traveling on the target lane.

The detecting unit 32 may change the predetermined feature or situation to be detected as a trigger for notification, depending on the type of the change of the travel condition of the vehicle 10 or the cause of a change of the controller of the vehicle 10. For example, when the change of the travel condition of the vehicle 10 is a lane change caused by merging or branching of the lane on which the vehicle 10 is traveling, the detecting unit 32 may detect a signpost or road marking showing information on the merging or branching as the predetermined feature that is a trigger for notification. When the change of the travel condition of the vehicle 10 is a lane change caused by a reduction in the number of lanes, the detecting unit 32 may detect a signpost or road marking showing information on the reduction as the predetermined feature that is a trigger for notification. When the change of the travel condition of the vehicle 10 is a lane change for preventing the vehicle from entering a climbing lane, the detecting unit 32 may detect a signpost or road marking showing information on the climbing lane as the predetermined feature that is a trigger for notification. When the change of the travel condition of the vehicle 10 is a lane change caused by passing or exiting from a passing lane, the detecting unit 32 may detect a signpost or road marking showing information on the passing lane as the predetermined feature that is a trigger for notification. When the change of the controller of the vehicle 10 is caused by a switch from the automated driving mode to the manual driving mode required because the vehicle 10 goes outside the region represented on the high-precision map, the detecting unit 32 may detect a road marking showing a branch route for exiting from a freeway or a speed signpost in this branch route as the predetermined feature that is a trigger for notification.

When the maximum delaying quantity is set, the detecting unit 32 may change the predetermined feature or situation to be detected as a trigger for notification, depending on the maximum delaying quantity. For example, when the critical distance corresponding to the maximum delaying quantity is longer than a predetermined distance (e.g., 1 km), the detecting unit 32 may detect a predetermined situation, such as a situation immediately after another vehicle has passed the vehicle 10, as a trigger for notification; in contrast, when the critical distance is shorter than the predetermined distance, the detecting unit 32 may detect a predetermined feature, such as a predetermined signpost or road marking, as a trigger for notification.

When a predetermined feature that is visible to a driver, predetermined notification that is recognizable to the driver, or a predetermined situation around the vehicle 10 is detected, the detecting unit 32 notifies the timing control unit 33 of the detection result and the type of the relevant change of the travel condition or the controller.

Two or more of the predetermined feature that is visible to a driver, the predetermined notification that is recognizable to the driver, and the predetermined situation around the vehicle 10 may be detection targets that are triggers for notification; and when one of them is detected, the detecting unit 32 may notify the timing control unit 33 of the detection. For example, in the case that the change of the travel condition of the vehicle 10 is a lane change for a right turn, i.e., a change to the lane adjacent on the right side of the lane on which the vehicle 10 is currently traveling, when a signpost or road marking showing information on a right turn is detected, the detecting unit 32 may notify the timing control unit 33 of the detection. The detecting unit 32 may notify the timing control unit 33 of the detection when two or more of the above detection targets are detected. For example, when both a predetermined type of signpost and a situation that the vehicle 10 and another vehicle therearound have a predetermined positional relationship are detected, the detecting unit 32 may notify the timing control unit 33 of the detection. The detecting unit 32 may notify the timing control unit 33 of the detection when two or more of the detection targets are simultaneously detected. Alternatively, the detecting unit 32 may notify the timing control unit 33 of the detection in the case that two or more of the detection targets are detected in a predetermined period (e.g., several seconds to several tens of seconds). In this case, the detecting unit 32 may notify the timing control unit 33 of the detection only in the case that the two or more of the detection target are detected in a predetermined order.

When notified from the detecting unit 32 that the controller of the vehicle 10 will change and that a trigger for notification (as described above, a predetermined feature that is visible to a driver, predetermined notification that is recognizable to the driver, or a predetermined situation around the vehicle 10) has been detected, the timing control unit 33 notifies the driver of the change of the controller of the vehicle 10 via the user interface 7. For example, in the case of switching from the automated driving mode to the manual driving mode, when notified of the detection result from the detecting unit 32, the timing control unit 33 outputs notification information for displaying a message announcing this switch (e.g., "Automated driving will be finished soon. Hold the steering wheel to prepare for driving.") to the user interface 7 via the communication interface 21. In this case, the timing control unit 33 may include a message of a requested operation of the vehicle 10 in the notification information. For example, when the requested operation of the vehicle 10 is a lane change resulting from merging or branching of the lane, the notification information may include a message announcing the request of a lane change and the target lane (e.g., "Change lanes to the right."). In the case of requesting Hands-On, when notified of the detection result from the detecting unit 32, the timing control unit 33 outputs notification information for displaying a message of requesting Hands-On to the user interface 7 via the communication interface 21.

When notified from the detecting unit 32 that the travel condition of the vehicle 10 will change and that a trigger for notification has been detected, the timing control unit 33 instructs the vehicle control unit 34 to change the travel condition of the vehicle 10. For example, in the case that the vehicle 10 changes lanes in the automated driving mode, when notified of the detection result from the detecting unit 32, the timing control unit 33 notifies the vehicle control unit 34 of instructions to change lanes and the target lane.

The timing control unit 33 may notify the driver of a change of the travel condition of the vehicle 10 and also instruct the vehicle control unit 34 to make this change. For example, in the case that the change of the travel condition is a lane change, when notified of the detection result from the detecting unit 32, the timing control unit 33 may output notification information for displaying a message announcing a lane change to the user interface 7 via the communication interface 21, and also notify the vehicle control unit 34 of instructions to change lanes and the target lane.

When a predetermined delay time has elapsed since the timing control unit 33 was notified from the detecting unit 32 of detection of a predetermined feature that is visible to a driver, predetermined notification that is recognizable to the driver, or a predetermined situation around the vehicle 10, the timing control unit 33 may notify the driver via the user interface 7 that the travel condition or the controller of the vehicle 10 will change, or instruct the vehicle control unit 34 to change the travel condition of the vehicle 10. In this way, even though the predetermined feature is not visible to the driver at the time of detection, the notification or the change of the travel condition will be made after the feature has become visible to the driver.

The predetermined delay may be, for example, a preset fixed period (e.g., 3 to 5 seconds) shorter than the critical time corresponding to the maximum delaying quantity, or changed as a function of the speed of the vehicle 10. When the predetermined delay is changed as a function of the speed of the vehicle 10, the timing control unit 33 may set, for example, the time (Dt/Vc) obtained by dividing a predetermined target distance Dt by the current speed Vc of the vehicle 10 acquired by the ECU 8 from a vehicle speed sensor (not illustrated) mounted on the vehicle 10, to the predetermined delay. The target distance Dt is set to, for example, a supposed travel distance of the vehicle 10 from when the predetermined feature is detected until the feature becomes visible to the driver.

The predetermined delay may be dynamically changed, depending on the type or location of the detected feature. For example, when the detected feature is a signboard or signpost, the timing control unit 33 may decrease the target distance Dt as the height of the signboard or signpost from the road surface is smaller. This is because the smaller the height from the road surface, the shorter the distance within which the signboard or signpost is visible to the driver. When the signboard or signpost is detected on the basis of the high-precision map, the timing control unit 33 may regard the height of the signboard or signpost represented on the high-precision map as the height from the road surface. When the signboard or signpost is detected from an image captured by the camera 4, the bearing of the signboard or signpost with respect to the camera 4 is determined from the position of the region of the signboard or signpost on the image, and the distance from the camera 4 to the signboard or signpost is calculated from the ratio of the size of the region to a reference size of the signboard or signpost on the image, and the real-space size of the signboard or signpost. Thus, the timing control unit 33 may determine the height of the signboard or signpost from the road surface on the basis of the position of the camera 4 in the vehicle 10, the direction of the optical axis of the camera 4, and the bearing and distance from the camera 4.

When the detected feature is a road marking, such as a start or end of a lane division line, the timing control unit 33 may decrease the target distance Dt as the distance between the vehicle 10 and a vehicle traveling ahead of the vehicle 10 is shorter. This is because the shorter the distance between the vehicles, the shorter the distance within which the road marking is visible to the driver. When the preceding vehicle is detected with a sensor signal from a distance sensor, such as LiDAR, which can measure the distance to the preceding vehicle, the timing control unit 33 may determine the distance between the vehicles on the basis of the sensor signal. When the preceding vehicle is detected from an image captured by the camera 4, the timing control unit 33 may calculate the distance between the vehicles from the real-space size of the model of the preceding vehicle, and the ratio of the size of the region of the preceding vehicle on the image to a reference size of the model of the preceding vehicle on the image for the case that the distance to the preceding vehicle is equal to a reference distance.

When the vehicle 10 has traveled a predetermined distance since the timing control unit 33 was notified from the detecting unit 32 of detection of a predetermined feature that is visible to a driver, predetermined notification that is recognizable to the driver, or a predetermined situation around the vehicle 10, the timing control unit 33 may notify the driver via the user interface 7 that the travel condition or the controller of the vehicle 10 will change, or instruct the vehicle control unit 34 to change the travel condition of the vehicle 10. For example, this predetermined distance may be equal to the target distance Dt.

The predetermined delay or the predetermined distance may be set so that the notification to the driver or the change of the travel condition will be made after the vehicle 10 has passed the detected feature. For example, when the change of the travel condition is a lane change for a right or left turn for the vehicle 10 to go to a destination, the signboard or signpost (hereinafter, referred to as the last signpost) nearest to the location where this turn will be made in the section from the current location of the vehicle 10 to the location of this turn and the signboard or signpost next to the last signpost may be detected as the feature. In this case, the timing control unit 33 may set the predetermined delay or the predetermined distance so that the notification or the change will be made after the vehicle 10 has passed the second last signboard or signpost. In this way, the timing control unit 33 can clearly indicate to the driver that the travel condition or the controller of the vehicle 10 will change. In this case also, the predetermined delay or the predetermined distance may be a preset fixed value or dynamically changed. For example, the predetermined delay or the predetermined distance may be set so that the notification or the change of the travel condition will be made before the vehicle 10 passes the last signpost. For example, the predetermined delay may be set to a period shorter than the time obtained by dividing the distance from the current location of the vehicle 10 to the last signpost by the current speed of the vehicle 10.

Even when the critical time corresponding to the maximum delaying quantity has elapsed or the vehicle 10 has traveled the critical distance since the timing control unit 33 was notified from the determining unit 31 of a change of the travel condition or the controller of the vehicle 10, the timing control unit 33 may not be notified from the detecting unit 32 of detection of a predetermined feature, notification or situation that is a trigger for notification. In such a case, even though the predetermined feature, notification or situation is not detected, the timing control unit 33 may notify the driver via the user interface 7 that the travel condition or the controller of the vehicle 10 will change, or instruct the vehicle control unit 34 to change the travel condition of the vehicle 10. In this way, even though the detecting unit 32 has failed to detect the predetermined feature, notification or situation that is a trigger for notification for some reason, the timing control unit 33 can notify the driver of a change of the travel condition or the controller of the vehicle 10, or cause the vehicle control unit 34 to make this change before the vehicle 10 reaches the furthest allowable location to make this change.

Figure 4:
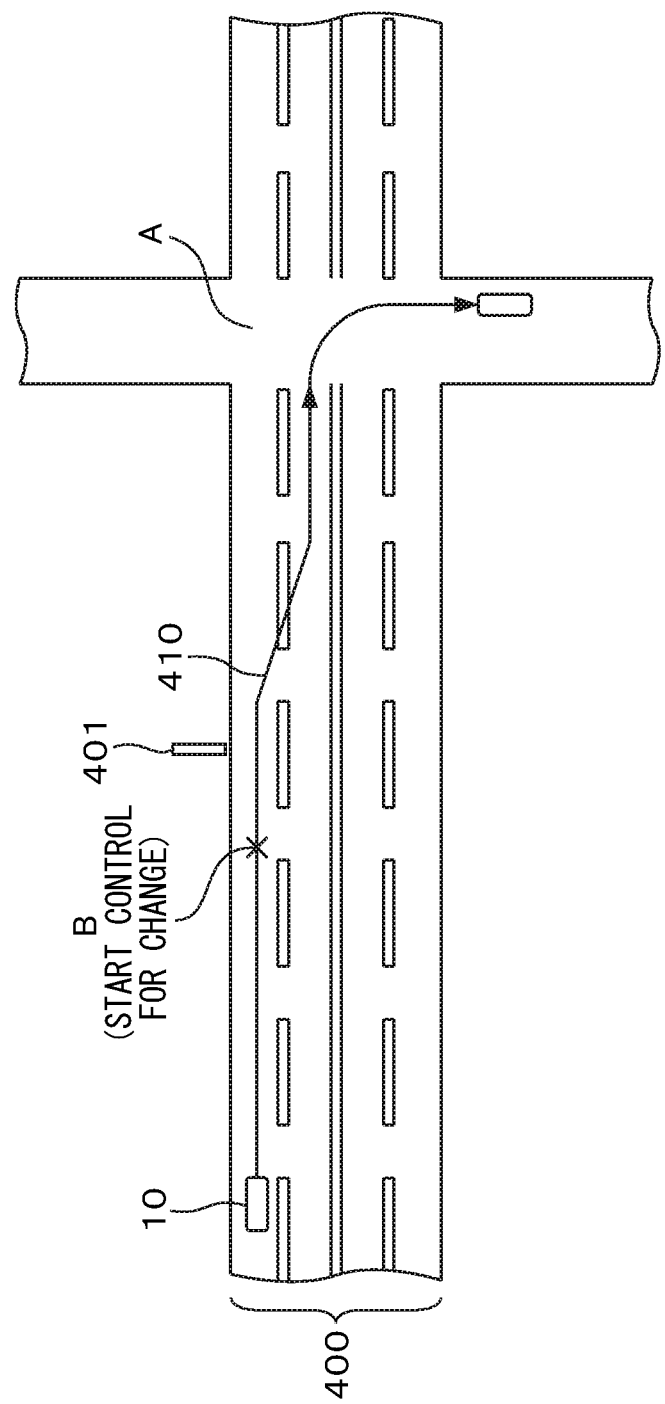
FIG. 4 illustrates an example of the relationship between a location where the travel condition of a vehicle is changed and a location where notification is made.

FIG. 4 illustrates an example of the relationship between a location where the travel condition of the vehicle 10 is changed and a location where notification is made. In this example, the vehicle 10 is traveling on the left lane of a road 400 with two lanes in each direction. The vehicle 10 needs to turn right at a location A, which is an intersection, to go to a destination along a travel route, and thus needs to move from the left lane to the right lane before reaching the location A. In the present embodiment, the vehicle 10 thus detects a signpost 401 closer to the current location of the vehicle 10 than the location A, and travels on the left lane as far as a location B where this signpost becomes visible to the driver, as illustrated by a trajectory 410. After reaching the location B, the vehicle 10 moves from the left lane to the right lane. Accordingly, seeing the signpost 401, the driver can expect that a lane change will be made.

Figure 5:
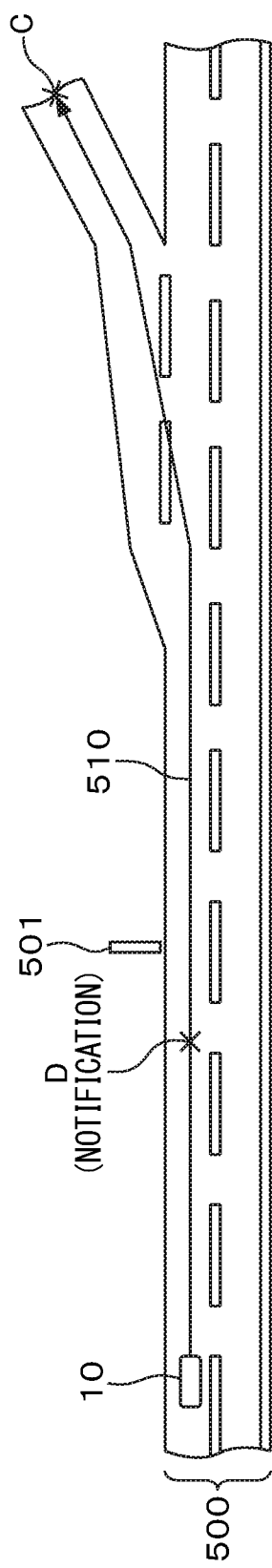
FIG. 5 illustrates an example of the relationship between a location where the controller of a vehicle is changed and a location where notification is made.

FIG. 5 illustrates an example of the relationship between a location where the controller of the vehicle 10 is changed and a location where notification is made. In this example, the vehicle 10 is traveling on a freeway 500 and will exit from the freeway 500 to an ordinary road at a location C, as illustrated by a trajectory 510. Assume that the freeway 500 is represented on the high-precision map, but ordinary roads are not represented, and that the automated driving mode is applicable to the vehicle 10 on the freeway 500 but is not applicable on the ordinary roads. Accordingly, the controller of the vehicle 10 is changed from the ECU 8 to the driver at the location C. In other words, a switch from the automated driving mode to the manual driving mode is made. In the present embodiment, the vehicle 10 thus detects a signpost 501 closer to the vehicle 10 than the location C; and when reaching a location D where this signpost becomes visible to the driver, the vehicle 10 notifies the driver via the user interface 7 of a switch from the automated driving mode to the manual driving mode. Accordingly, seeing the signpost 501, the driver can expect that a switch from the automated driving mode to the manual driving mode will be made. This enables the driver to appropriately drive the vehicle 10 even immediately after the applied driving mode is switched to the manual driving mode.

Figure 6:
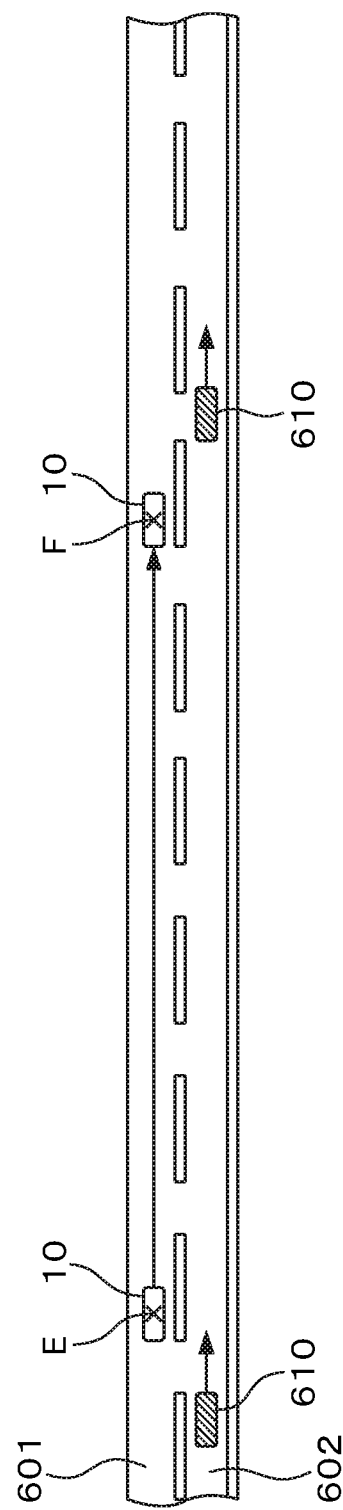
FIG. 6 illustrates a situation that a lane change is made.

FIG. 6 illustrates a situation that a lane change is made. In this example, when a predetermined situation occurs around the vehicle 10, a lane change, which is an example of the change of the travel condition of the vehicle 10, is made. In this example, the vehicle 10 is traveling on a left lane 601, and is about to move to a right lane 602. When the vehicle 10 is at a location E, a vehicle 610 traveling on the right lane 602 faster than the vehicle 10 exists on the backward right of the vehicle 10. For this reason, the lane change is not made at the time of the location E. When the vehicle 10 then reaches a location F, the vehicle 610 has passed the vehicle 10 and exists on the forward right of the vehicle 10. Hence, it is unlikely that another vehicle is traveling near the vehicle 10 on the target lane 602. Accordingly, when the situation that the vehicle 610 traveling on the target lane 602 has passed the vehicle 10 is detected at the location F, the vehicle control unit 34 makes a lane change or proposes changing lanes via the user interface 7.

While the automated driving mode is applied to the vehicle 10, the vehicle control unit 34 generates one or more planned travel courses (trajectories) of the vehicle 10 in the nearest predetermined section (e.g., 500 m to 1 km) so that the vehicle 10 will travel along the travel route to a destination. The planned travel course is represented, for example, as a set of target locations of the vehicle 10 at respective time points while the vehicle 10 travels through the predetermined section. The vehicle control unit 34 controls the components of the vehicle 10 so that the vehicle 10 will travel along the planned travel course.

In the present embodiment, when notified from the timing control unit 33 that the travel condition of the vehicle 10 will change, the vehicle control unit 34 generates the planned travel course so as to make the change. For example, when notified of a lane change from the timing control unit 33, the vehicle control unit 34 generates the planned travel course so as to change lanes. When not notified from the timing control unit 33 that the travel condition of the vehicle 10 will change, the vehicle control unit 34 may generate the planned travel course so as to maintain the current travel condition.

The vehicle control unit 34 generates the planned travel course so that the vehicle 10 will not collide with objects around the vehicle 10 detected from time-series images captured by the camera 4. For example, the vehicle control unit 34 tracks the objects detected from the time-series images, and uses the trajectories obtained from the track result to determine predicted trajectories of the respective objects to a predetermined time ahead. The vehicle control unit 34 can then estimate the locations of the detected objects at the times of capturing the respective images, using the current location and orientation of the vehicle 10, estimated distances to the detected objects, and the directions from the vehicle 10 toward the objects at the times of capturing the respective images. As described in relation to the determining unit 31, the location and orientation of the vehicle 10 may be estimated by detecting lane division lines on the right and left of the vehicle 10 from every image captured by the camera 4 and by matching the detected lane division lines to those on the high-precision map. The estimated distance from the vehicle 10 to a detected object is determined on the basis of the real-space size of the object, and the ratio of the size of the region of the object on the image to a reference size of the object on the image for the case that the distance to the object is equal to a reference distance. The reference distance, and the reference size and the real-space size of the detected object on the image may be prestored, for example, in the memory 22. The direction from the vehicle 10 toward the object is determined from the position of the object on the image, and the position and orientation of the camera 4 with respect to the vehicle 10. The vehicle control unit 34 can track the detected objects by using, for example, a Kalman Filter or a Particle Filter to perform a tracking process on the estimated locations of the objects at the times of capturing the respective images.

The vehicle control unit 34 generates the planned travel course of the vehicle 10 on the basis of the predicted trajectories of the tracked objects so that for any tracked object, a predicted distance between the vehicle 10 and the object will be greater than a predetermined distance until a predetermined time ahead.

The vehicle control unit 34 may generate multiple planned travel courses. In this case, the vehicle control unit 34 may select one of the planned travel courses such that the sum of the absolute values of acceleration of the vehicle 10 is the smallest.

The vehicle control unit 34 controls the components of the vehicle 10 so that the vehicle 10 will travel along the determined planned travel course. For example, the vehicle control unit 34 determines the acceleration of the vehicle 10 in accordance with the planned travel course and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 34 determines the amount of fuel injection in accordance with the determined degree of accelerator opening, and outputs a control signal depending on the amount of fuel injection to a fuel injector of the engine of the vehicle 10. Alternatively, the vehicle control unit 34 outputs a control signal depending on the determined amount of braking to the brake of the vehicle 10.

When the vehicle 10 changes its course in order to travel along the planned travel course, the vehicle control unit 34 determines the steering angle of the vehicle 10 in accordance with the planned travel course, and outputs a control signal depending on the steering angle to an actuator (not illustrated) controlling the steering wheel of the vehicle 10.

Figure 7:
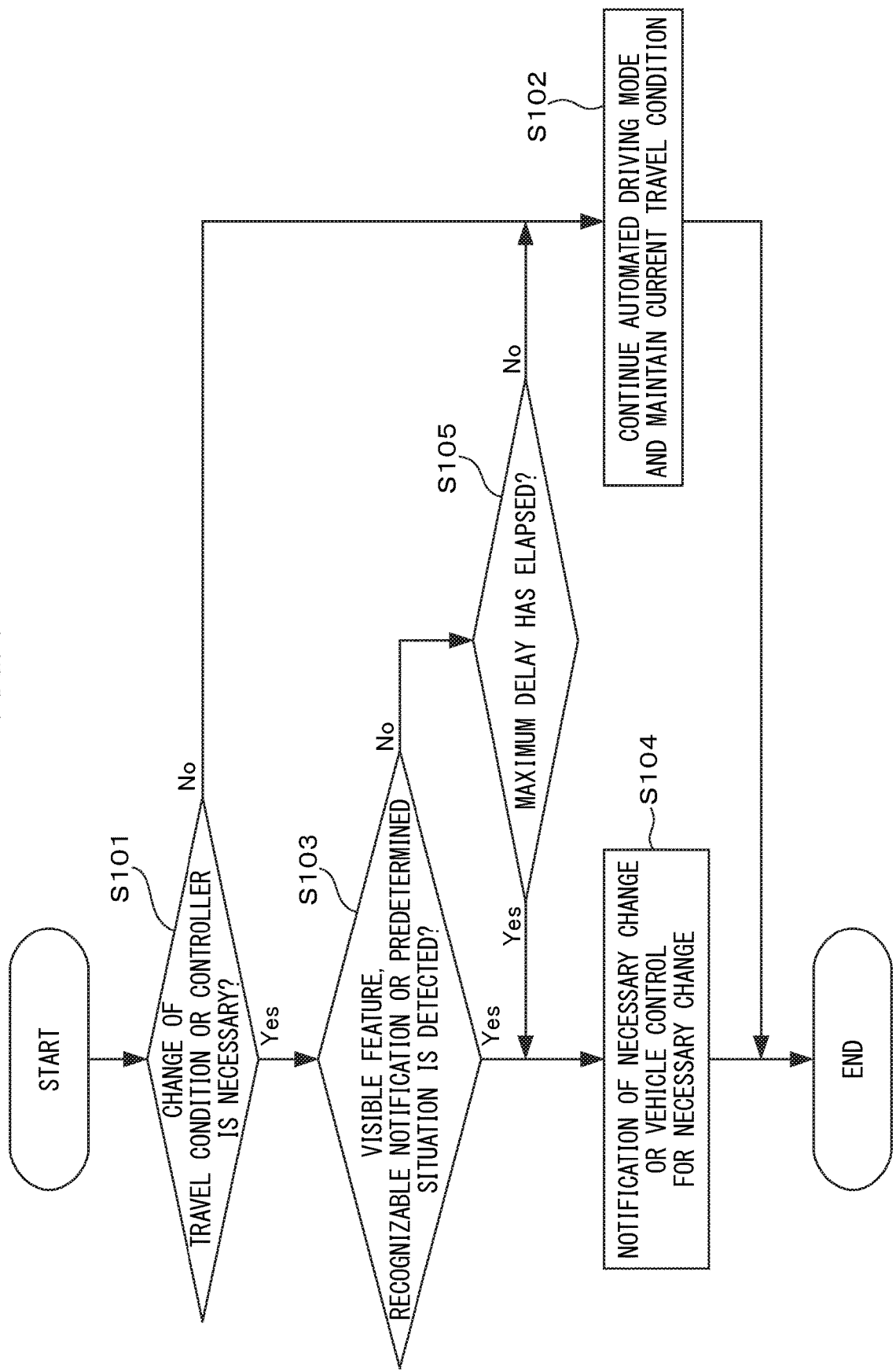
FIG. 7 is an operation flowchart of a vehicle control process.

FIG. 7 is an operation flowchart of the vehicle control process performed by the processor 23. While the automated driving mode is applied to the vehicle 10, the processor 23 may perform the vehicle control process in accordance with the following operation flowchart every predetermined period.

The determining unit 31 of the processor 23 determines whether a change of the travel condition or the controller of the vehicle 10 is necessary while the vehicle 10 travels a predetermined distance from the current location along the travel route (step S101). When neither a change of the travel condition of the vehicle 10 nor a change of the controller thereof is necessary (No in step S101), the vehicle control unit 34 of the processor 23 continues application of the automated driving mode and controls the components of the vehicle 10 so as to maintain the current travel condition (step S102).

When at least one of the change of the travel condition and the change of the controller thereof is necessary (Yes in step S101), the detecting unit 32 of the processor 23 determines whether a predetermined feature that is visible to a driver, predetermined notification that is recognizable to the driver, or a predetermined situation around the vehicle 10 is detected (step S103). When a feature that is visible to a driver, notification that is recognizable to the driver, or a predetermined situation around the vehicle 10 is detected (Yes in step S103), the timing control unit 33 of the processor 23 notifies the driver of the type of the necessary change via the user interface 7, or causes the vehicle control unit 34 of the processor 23 to make this change (step S104). As described above, the timing control unit 33 may perform the process of step S104 when a predetermined delay has elapsed since detection of a feature that is visible to a driver, notification that is recognizable to the driver, or a predetermined situation around the vehicle 10.

When neither the feature that is visible to a driver, the notification that is recognizable to the driver, nor the predetermined situation around the vehicle 10 is detected in step S103 (No in step S103), the timing control unit 33 determines whether the critical time corresponding to the maximum delaying quantity has elapsed since the determination that at least one of the change of the travel condition and the change of the controller thereof is necessary (step S105). When the critical time has elapsed (Yes in step S105), the timing control unit 33 performs the process of step S104. When the critical time has not elapsed (No in step S105), the vehicle control unit 34 performs the process of step S102. After step S102 or S104, the processor 23 terminates the vehicle control process.

As has been described above, the apparatus for automated driving determines whether a change of a travel condition or a controller of a vehicle that is being automatically driven is necessary, and, when this change is necessary, detects a predetermined feature that is visible to a driver, predetermined notification that is recognizable to the driver, or a predetermined situation around the vehicle. When such a feature, notification or situation is detected, the apparatus controls the vehicle so as to change the travel condition or the controller, or notifies the driver of this change with a notifying device. The apparatus thus enables the driver to grasp the timing to change the travel condition of the vehicle or the timing to switch from the automated driving mode to the manual driving mode. As a result, the apparatus can reduce driver's anxiety and thus enable the driver to appropriately drive the vehicle immediately after a switch from the automated driving mode to the manual driving mode. Since the driver can grasp the timing to change the travel condition of the vehicle or the timing to switch from the automated driving mode to the manual driving mode, the driver can easily decide to switch the driving mode from the automated driving mode to the manual driving mode for himself/herself as necessary.

A computer program for achieving the functions of the processor 23 of the ECU 8 according to the above embodiment or modified example may be provided in a form recorded on a non-transitory computer-readable medium, such as a semiconductor memory, a magnetic recording medium, or an optical recording medium.

As described above, those skilled in the art may make various modifications according to embodiments within the scope of the present invention.

What is claimed is:

1. An apparatus for automated driving, comprising a processor configured to:
   determine whether a change of a travel condition or a controller of a vehicle that is being automatically driven is necessary;
   determine a maximum delaying quantity indicating a location furthest from the vehicle or latest timing to start the change determined to be necessary, the maximum delaying quantity being determined so that the change is to be finished within a critical distance or time;
   when the change is necessary, detect a predetermined feature related to the necessary change that is visible to a driver and is located between a current position of the vehicle and the location corresponding to the maximum delaying quantity;
   when the predetermined feature is detected, control the vehicle to make the change, or notify the driver of the change with a notifying device;
   and when the distance or time corresponding to the maximum delaying quantity is reached or elapsed since determining that the change is necessary, control the vehicle so as to make the change even though the predetermined feature is not detected.

2. The apparatus according to claim 1, wherein when a predetermined delay time has elapsed since detection of the feature, the processor controls the vehicle so as to make the change or notifies the driver of the change with the notifying device.

3. The apparatus according to claim 2, wherein the processor adjusts the predetermined delay time as a function of a speed of the vehicle at the time of detection of the feature, a height of the detected feature measured from a road surface, or an interval between the vehicle and another vehicle traveling ahead of the vehicle.

4. The apparatus according to claim 1, wherein the predetermined feature is a signpost or road marking related to the change.

5. The apparatus according to claim 1, wherein the processor is further configured to, when the change is necessary, detect a predetermined notification that is recognizable to the driver; and
   when the predetermined notification is detected, control the vehicle so as to make the change, or notify the driver of the change with the notifying device; and wherein the predetermined notification is traffic information on a traffic situation that causes the change, the traffic information being received with a wireless communication device mounted on the vehicle.

6. The apparatus according to claim 1, wherein the change determined to be necessary is a change of lanes on which the vehicle travels, and as a predetermined situation, the processor detects a situation around the vehicle in which the driver recognizes that the change of lanes is to be made safely.

* * * * *